United States Patent
Li et al.

(10) Patent No.: US 9,679,147 B2
(45) Date of Patent: Jun. 13, 2017

(54) SYSTEM AND METHOD FOR AUTOMATED SECURITY TESTING

(71) Applicants: Keqin Li, Antibes (FR); Cedric Hebert, Mougins (FR); Holger Mack, Karlsruhe (DE); Tom Schröer, Walldorf (DE)

(72) Inventors: Keqin Li, Antibes (FR); Cedric Hebert, Mougins (FR); Holger Mack, Karlsruhe (DE); Tom Schröer, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/486,431

(22) Filed: Sep. 15, 2014

(65) Prior Publication Data

US 2016/0078234 A1     Mar. 17, 2016

(51) Int. Cl.
*H04L 29/06* (2006.01)
*G06F 21/60* (2013.01)
*G06F 21/57* (2013.01)

(52) U.S. Cl.
CPC .......... *G06F 21/604* (2013.01); *G06F 21/577* (2013.01); *H04L 63/08* (2013.01)

(58) Field of Classification Search
CPC .............................. H04L 63/08; H04L 63/085
See application file for complete search history.

(56) References Cited

U.S. PATENT DOCUMENTS

| | | | | |
|---|---|---|---|---|
| 8,621,639 B1* | 12/2013 | Pennington | ......... | G06F 11/3692 380/30 |
| 2003/0093321 A1* | 5/2003 | Bodmer | ................ | G06Q 30/06 705/26.41 |
| 2004/0260622 A1* | 12/2004 | Chan | ...................... | G06Q 10/10 705/26.1 |
| 2004/0261053 A1* | 12/2004 | Dougherty | ............... | G06F 8/20 717/101 |
| 2005/0262432 A1* | 11/2005 | Wagner | ..................... | G06F 8/71 715/229 |
| 2006/0156031 A1* | 7/2006 | Sturms | ................ | G06F 21/6218 713/189 |
| 2006/0236187 A1* | 10/2006 | Skog | ................... | G06F 11/0709 714/746 |
| 2006/0259367 A1* | 11/2006 | Sattler | ..................... | G06F 21/31 705/26.35 |

(Continued)

OTHER PUBLICATIONS

John F Barkley et al., Role Based Access Control for the World Wide Web, Apr. 8, 1997, NIST, pp. 1-11.*

(Continued)

*Primary Examiner* — Kari Schmidt
*Assistant Examiner* — Fahimeh Mohammadi
(74) *Attorney, Agent, or Firm* — Buckley, Maschoff & Talwalkar LLC (57) ABSTRACT

According to some embodiments, a list of files comprising each file in a data repository that is associated with the website is determined. A list of user roles comprising each user role in the data repository that is associated with the website is determined. Each file in the list of files based on each user role in the list of user roles is attempted to be accessed and a report indicating the success or failure of the attempt to access each file in the list of files based on each user role in the list of user roles is created.

18 Claims, 5 Drawing Sheets

(56) References Cited

U.S. PATENT DOCUMENTS

| | | | | |
|---|---|---|---|---|
| 2008/0059704 A1* | 3/2008 | Kavuri | .................... | G06F 3/061 |
| | | | | 711/117 |
| 2010/0100933 A1* | 4/2010 | Rose | .................... | H04L 63/102 |
| | | | | 726/3 |
| 2011/0173299 A1* | 7/2011 | Lightstone | ........ | G06F 17/30893 |
| | | | | 709/219 |
| 2012/0297183 A1* | 11/2012 | Mukkara | ............... | H04L 9/0894 |
| | | | | 713/153 |
| 2014/0041012 A1* | 2/2014 | Yeow | .................... | H04L 63/02 |
| | | | | 726/11 |

OTHER PUBLICATIONS

David F. Ferraiolo et al., A Role-Based Access Control Model and Reference Implementation Within a Corporate Intranet, Feb. 1999, ACM, vol. 2 Issue 1, pp. 34-64.*

Hua Wang et al., A Flexible Payment Scheme and Its Role-Based Access Control, Mar. 2005, IEEE, vol. 17, No. 3, pp. 425-436.*

Shin-Jer Yang et al., Design Role-Based Multi-Tenancy Access Control Scheme for Cloud Services, Jul. 2-5, 2013, IEEE, pp. 273-279.*

* cited by examiner

| No Role | Manager Role | Developer Role | Client Role |
|---|---|---|---|
| X.html | A.html | A.html | A.html |
| X1.html | B.html | B.html | X.html |
|  | C.html | C.html | Y.html |
|  | X.html | X.html | Z.html |
|  | X2.html | X1html |  |
|  | Y.html | X2.html |  |
|  | Z.html | Y.html |  |
|  |  | Z.html |  |
| 310 | 320 | 330 | 340 |

SYSTEM AND METHOD FOR AUTOMATED SECURITY TESTING

BACKGROUND

Integrating websites with database systems to create web pages can require complex security schemes to properly authenticate a plurality of different kinds of users, many of which have different roles in an organization that require each kind of user to require specific access rights. Creating a plurality of user roles with different accesses rights may lead to some website files being accidentally exposed and potentially discoverable by hackers. This may be especially true as the website matures and new files are added and older files become unlinked. For example, certain files may be linked in the web site based on user roles and some older files which are deemed not up to date may be unlinked. These unlinked files may be accidently copied or may reside in an old directory and they are not easily visible to the developer. In this situation, a hacker could initiate a file enumeration attack which is an attack where the aim is to enumerate and access resources that are not referenced by the application, but are still accessible.

An attacker may use brute force techniques to search for unlinked contents in a directory, such as temporary directories and files, as well as old backup and configuration files. These unlinked files may still store sensitive information about web applications and operational systems, such as source code, credentials, internal network addressing, and so on, thus being considered a valuable resource for intruders. Therefore, there is a need for a developer to quickly determine potential security breaches in systems having complex security rules.

DETAILED DESCRIPTION

The systems and methods discussed below may relate to an automated security testing method that resides within a development and administration tool used by a developer working with a database engine (e.g., a security testing extension). A security testing extension may comprise a function of a developer platform that automatically interacts with the development and administration tool to check which kind of user can access which website files (e.g., development time artifacts) when an application is deployed. Knowing which kind of user can access which website files may be used by the developer to adjust the authorization of user roles to prevent a file enumeration attack or other attacks such as, but not limited to, a structured query language ("SQL") injection attack against the website. This method may be fully automated and may be initiated by the developer pressing a button on a graphical user interface associated with the developer platform. Results of the method may show a current security situation associated with the website. The present embodiments may provide integration and automation of security testing into a development environment which may use knowledge related to development artifacts for security testing. The present embodiments may provide more thorough security testing than conventional black box vulnerability scanners.

Figure 1:
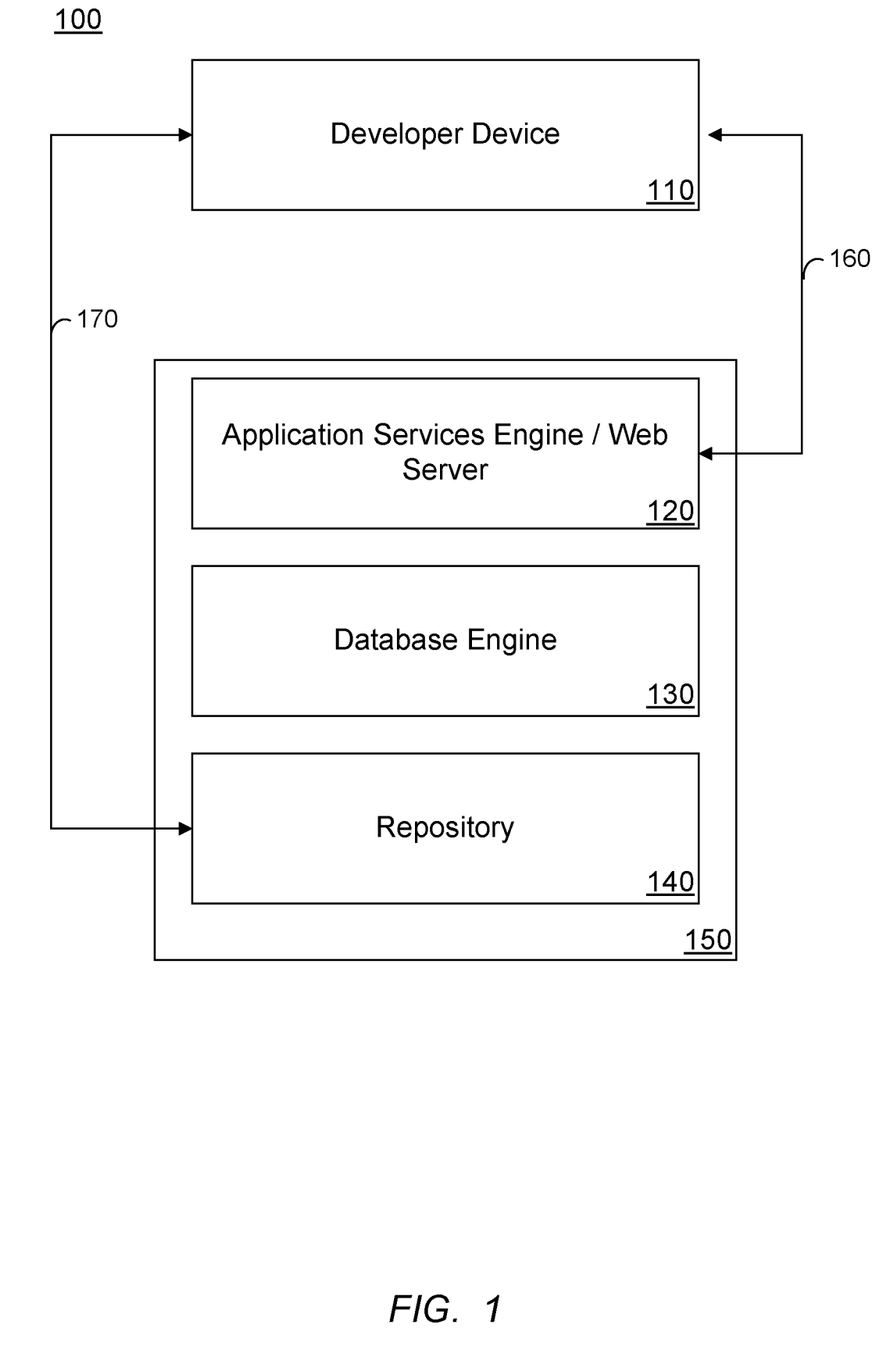
FIG. 1 is a block diagram of a system according to some embodiments.

Referring now to FIG. 1, an embodiment of a system 100 is illustrated. The system 100 may relate to a development system and may comprise a developer device 110 and a database system 150. The developer device 110 may comprise a desktop computer, a laptop computer or any device, comprising a hardware computer processor, which may be used for development purposes. In some embodiments, the system 100 may perform a security assessment directly from within a development environment (e.g., the system 100) and may restrict testing to existing files to avoid potential legal implications of running vulnerability scanners in a corporate environment. Therefore the system may be less capable in terms of scanning breadth and depth than conventional black box vulnerability scanners, but the present embodiments provide a benefit of controlling security towards a specific target application.

The database system 150 may comprise a database engine 130 that includes a data repository 140 and an application services engine/web server 120. In one embodiment, the database engine 130 may comprise an in-memory data platform comprising a computer processor that is deployable on premise or on demand. The database engine 130 may function as an in-memory relational database engine. The database engine 130 may also be in communication with the application services engine that comprises a set of embedded services to provide end-to-end support for Web-based applications. The embedded services may comprise the web server 120, configurable OData support, server-side Java Script execution, and an ability to execute both SQL and SQLScript.

The developer device 110 may access the web server 120 via a Hypertext Transfer Protocol ("HTTP") request which is indicated as 160. The developer device 110 may access the repository 140 via a repository application programming interface ("API") which is indicated as 170. The web server 120 may comprise a computer processor that processes the incoming http requests.

The present embodiments may facilitate bridging a gap between application development and security testing performed by conventional black box vulnerability scanners which may allow a developer to rapidly discover and fix detected problems instead of committing the code to a production environment and then later getting a report regarding discovered security issue(s). Furthermore, in some embodiments, a developer may perform static code analysis for security during design time to facilitate the building of secure applications.

Figure 2:
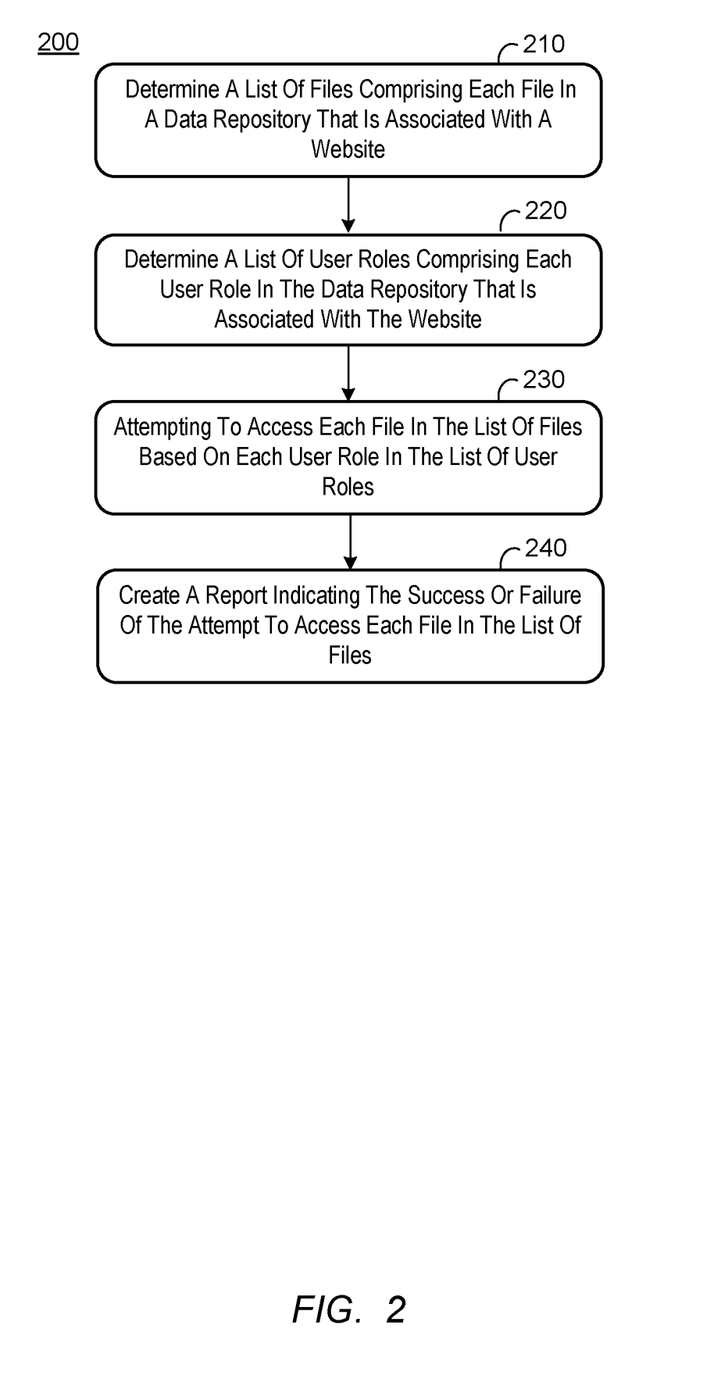
FIG. 2 illustrates a method in accordance with some embodiments.

Now referring to FIG. 2, an embodiment of a process 200 is illustrated. In some embodiments, various hardware elements (e.g., a hardware computer processor) of a system may perform the process 200. The process 200 and other processes mentioned herein may be embodied in processor-executable program code read from one or more non-transitory computer-readable media, such as a floppy disk, a CD-ROM, a DVD-ROM, a Flash drive, and a magnetic tape, and may be stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software. The present process 200 may comprise an automated process such that a developer may initiate the following method by clicking a button and waiting for a report to be returned where the report indicates a result of security testing. After obtaining the report, the developer may adjust authorization settings to restrict or enhance the access to specific files and/or user roles. In some embodiments, the report may indicate unused files that could comprise a potential security breach if discovered.

At 210, a list of files comprising each file in a data repository that is associated with a website is determined. The list of files may be obtained by querying the repository for the list of files associated with the website via a repository API. In some embodiments, the list of files may also comprise locations (e.g., a directory and or drive indicator) of each file in the list of files. The repository, in response to the query for the list of files may transmit the list of files to a device (e.g., a developer device) that requested the list of files via the repository API.

For illustrative purposes, and to aid in understanding features of the specification, an example will be introduced. These examples are not intended to limit the scope of the claims. In the present example, a developer device may transmit a request to a repository (e.g., a query) for a list of files associated with a website via a repository API. In response to the request, the repository may transmit a list of files to the developer device. Now referring to FIG. 3, an embodiment of an access report 300 that is based on user roles is illustrated. In the present example, the developer may access all files associated with the website and a list of files that a developer can access is indicated at 330. In some embodiments, the access report 300 may also include a location (e.g., directory) of each file listed in the report.

Figure 3:
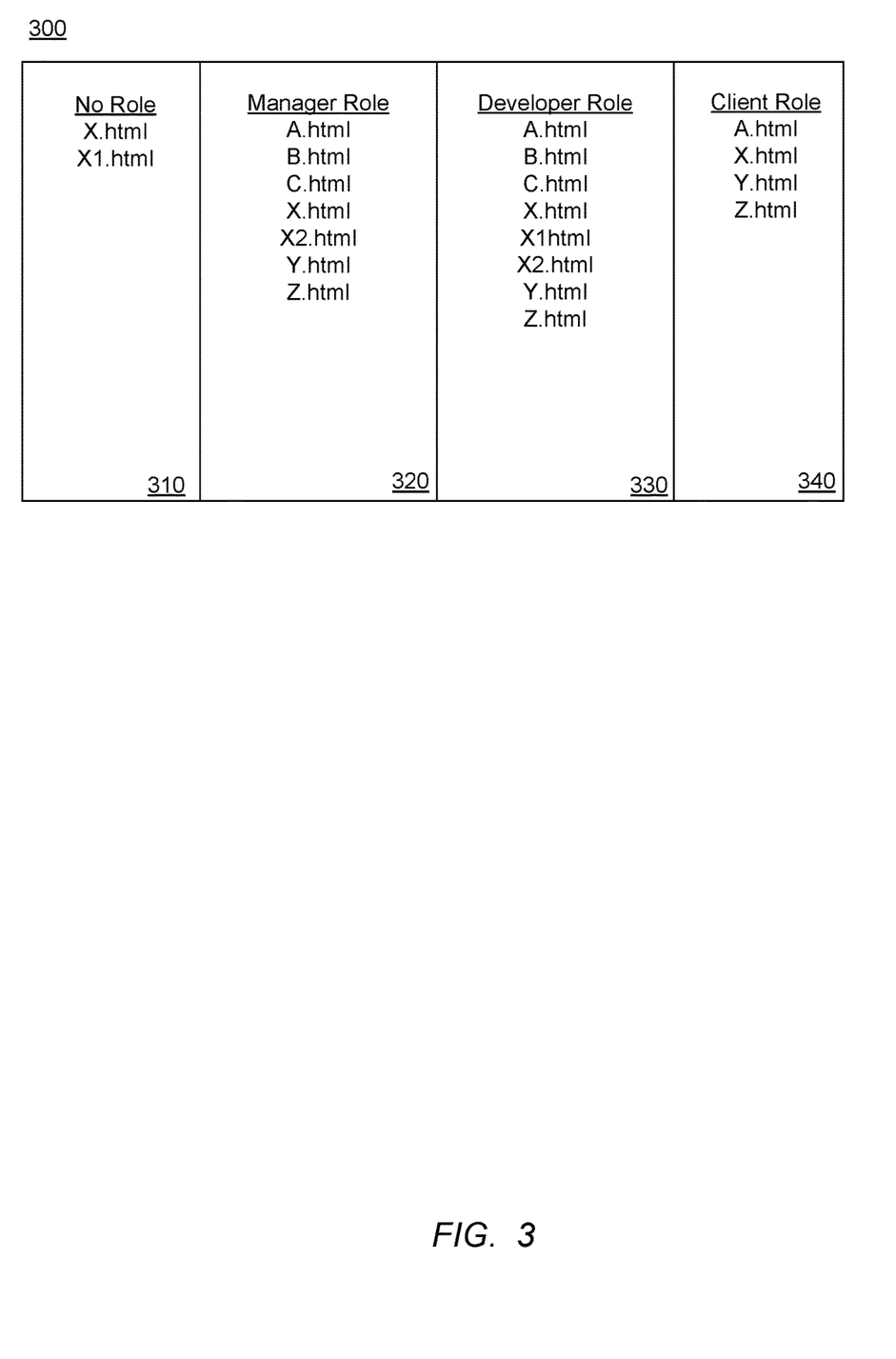
FIG. 3 is user role access report according to some embodiments.

In the present example, the list of files returned by the repository comprises: A.html, B.html, C.html, X.html, Y.html, X1.html, X2.html, and Z.html. While .html files are indicated in the present example, any file that may be used with a website may be included in the list of files. For example, files in the list of files may include, but are not limited to, .xml, .php or .net files.

In the present example, the files X1.html and X2.html comprise previous versions of the file X.html. As illustrated in this example, the previous versions of X.html (e.g., X1.html and X2.html) have not been deleted and may still be accessible.

Referring back to FIG. 2, a list of user roles comprising each user role in the data repository, that is associated with the website, is determined at 220. The list of user roles may be obtained by querying the repository for the list of user roles associated with the website via a repository API. The repository, in response to the query for the list of user roles may transmit the list of user roles to the device (e.g., the developer device) that requested the list of user roles via the repository API. User roles may comprise indicators of role-based access control to restrict system access to authorized users. Each user role may be created based on various job functions and permissions to access specific files may be assigned to specific user roles.

Referring again to FIG. 3, in the present example, the list of user roles may comprise three roles, manager role 320, developer role 330 and client role 340. As also indicated in the access report 300, a user that has no role is indicted at 310.

An attempt to access each file in the list of files based on each user role in the list of user roles is made at 230. In other words, an access attempt for each combination of user role and file is made. The access attempt may comprise creating a user in the repository with a particular user role and attempting to open or execute each file in the list of files for each user role. An attempt to open each file may be made for each user role by logging into the website via an http request and attempting to access each file in the list of files. For example, file X.html will be attempted to be opened using the manager role 320, the developer role 330 and the client role 340. Furthermore, at attempt to open each file may also be made by the user that does not have a role 310. A result of each attempt may generate an http code such as http code 200 (e.g., OK) for a successful attempt which indicates that information associated with the response was returned. However, if the attempt was unsuccessful, an http code of 404 (e.g., Not Found) may be transmitted. An http 404 code may indicate that a requested file was not found.

Continuing with the above example, the developer role 330 may be given permission to access every file, the manager role 320 may be given permission to access files A.html, B.html, C.html, X.html, Y.html, and Z.html, the client role 340 may be given permission to access files X.html, Y.html and Z.html, and the user without a role may be given permission to access only X.html.

At 205, a report indicating the success or failure of the attempt to access each file in the list of files is created. The report may be presented to a developer in a file that the developer can print or save. Continuing with the above example, and as illustrated in report 300, the manager role 320, which is given permission to access files A.html, B.html, C.html, X.html, Y.html, and Z.html, also has access to file X2.html. The client role 340, which is given permission to access files X.html, Y.html and Z.html, also has access to file A.html. The user without a role which is given permission to access only X.html also has access to X1.html. Therefore, given this access information, a developer can modify security regarding files X1.html, X2.html and A.html and/or modify security associated with user roles to prevent unauthorized access to files X1.html, X2.html and A.html.

Figure 4:
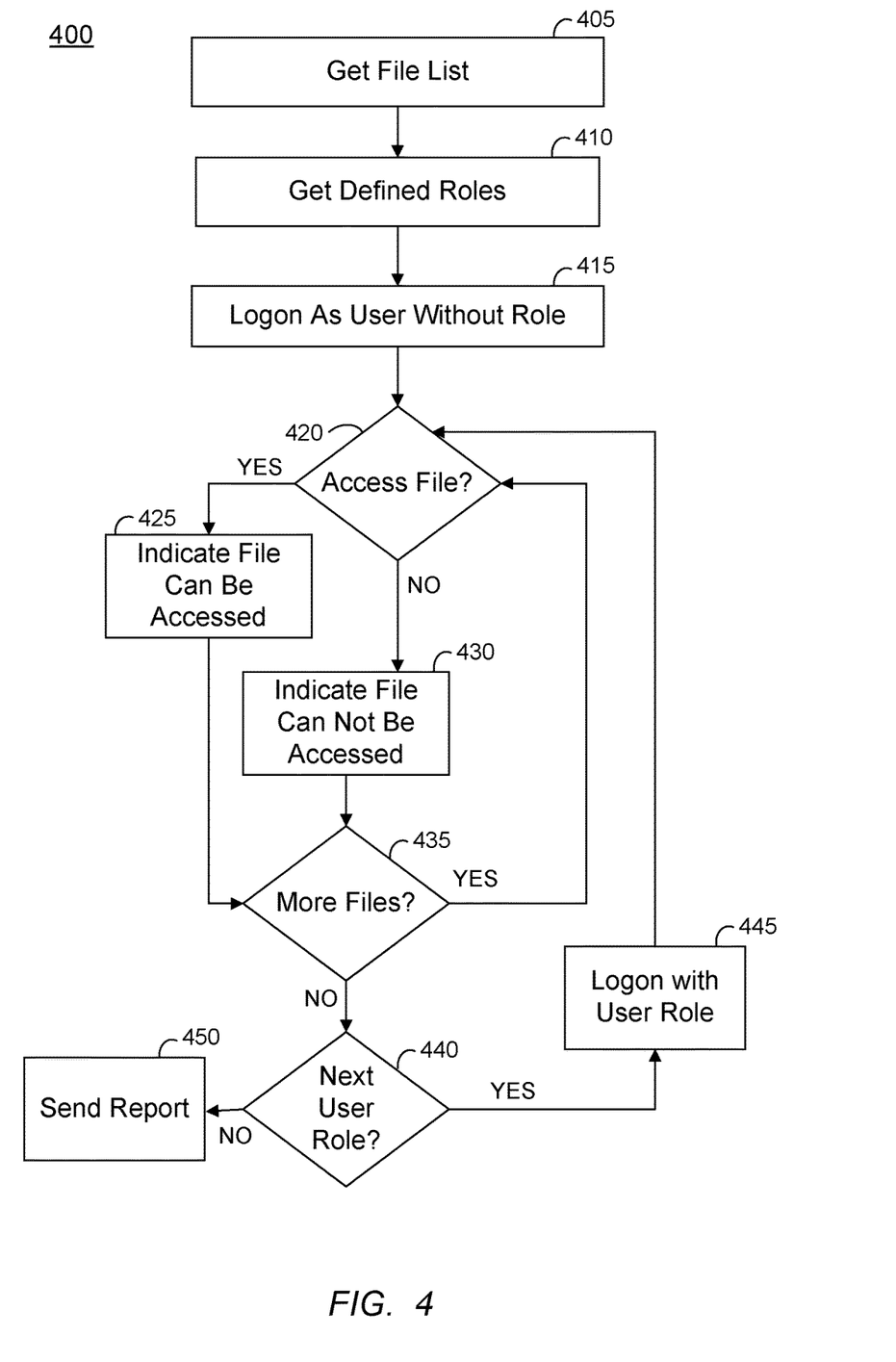
FIG. 4 is a flow diagram associated with security testing in accordance with some embodiments.

Now referring to FIG. 4, an embodiment of a process 400 is illustrated. Like process 200 of FIG. 2, process 400 may be performed by various hardware elements (e.g., a hardware computer processor) and the process 400 may be embodied in processor-executable program code read from one or more non-transitory computer-readable media.

At 405, a file list is retrieved from a data repository. The file list may comprise information associated with each file in a data repository that is related to a specific website. For example, the file list may comprise a name and a location for each file in the list (e.g., a website directory). At 410, a list of defined user roles is retrieved. The list of defined user roles may comprise a list of user roles in the data repository that are associated with the specific website. However, in some embodiments, the list of defined user roles may be retrieved from a developer device, such as developer device 110, and created on the data repository via the repository API.

At 415, a user that does not comprise a user role may logon to the website. For example, a developer device may automatically create a user in the data repository via a repository API, and then the developer device, via an HTTP connection, may automatically logon to the website as the newly created user that does not comprise a user role. The user that that does not comprise a user role, once logged on, may attempt to access each respective file in the file list at 420. If a respective file can be accessed, the file is indicated as being accessed at 425 (e.g., an HTTP code 200). However, if the file cannot be accessed, the file is indicated as not being able to be accessed at 430 (e.g., an HTTP code 404). A determination is made at 435 if a last file in the list is being attempted to be accessed. If the file is not the last file, the process loops back to 420 to continue attempting to access files. If the file is the last file in the file list, the process continues to 440 to determine if a next user roles to access the list of files has been used as part of the security test. If a next user roles to access the list of files has not been used as part of the security test, then the developer device may automatically create a user for the next user role in the data repository via a repository API, and then the developer device, via an HTTP connection, may automatically logon to the website as the newly created user that comprises the next user role at 445. Once access to each file in the file list has been attempted to be accessed at 420 for each user role, the process continues to 450 where a report containing each file that can be accessed for each user role is created. The report may be sent to the developer. In some embodiments, instead of creating a new user for each user role, the developer device may automatically modify a user role for an existing user, via a repository API, and then the developer device, via an HTTP connection, may automatically logon to the website as the modified user.

Figure 5:
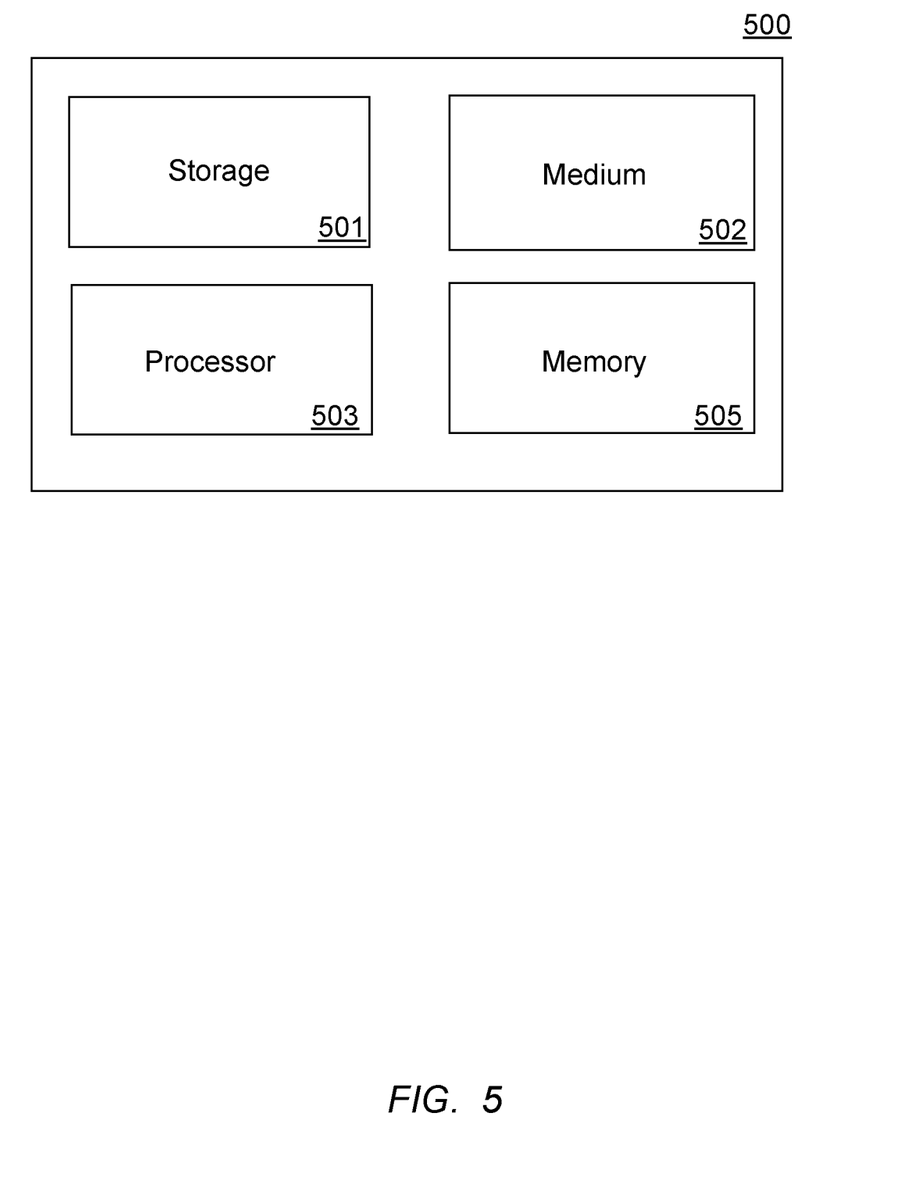
FIG. 5 illustrates a computing device in accordance with some embodiments.

Now referring to FIG. 5, an embodiment of a computer system 500 is illustrated. According to some embodiments, the computer system 500 may relate to a developer device. The apparatus 500 may comprise storage 501, a medium 502, a processor 503 and a main memory 505. According to some embodiments, the computer system 500 may further comprise a digital display port, such as a port adapted to be coupled to a digital computer monitor, television, portable display screen, or the like.

The storage device 501 may store information (e.g., including information associated with user roles). The medium 502 may comprise any computer-readable medium that may store processor-executable instructions to be executed by the processor 503. For example, the medium 502 may comprise a non-transitory tangible medium such as, but is not limited to, a compact disk, a digital video disk, flash memory, optical storage, random access memory, read only memory, or magnetic media.

The processor-executable instructions may be stored in a compressed, uncompiled and/or encrypted format. The processor-executable instructions may furthermore include program elements, such as an operating system, a database management system, and/or device drivers used by the processor 503 to interface with peripheral devices.

The processor 503 may include or otherwise be associated with dedicated registers, stacks, queues, etc. that are used to execute program code and/or one or more of these elements may be shared there between. In some embodiments, the processor 503 may comprise an integrated circuit. In some embodiments, the processor 503 may comprise circuitry to perform a method such as, but not limited to, the method described with respect to FIG. 2 and FIG. 4.

The processor 503 communicates with the storage device 501. The storage device 501 may comprise any appropriate information storage device, including combinations of magnetic storage devices (e.g., a hard disk drive), optical storage devices, and/or semiconductor memory devices. The storage device 501 may store a program for controlling the processor 503. The processor 503 performs instructions of the program, and thereby operates in accordance with any of the embodiments described herein. For example, the processor 503 may determine if a file can be accessed using a particular user role.

The main memory 505 may comprise any type of memory for storing data, such as, but not limited to, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 505 may comprise a plurality of memory modules.

Various modifications and changes may be made to the foregoing embodiments without departing from the broader spirit and scope set forth in the appended claims. Further, although the aforementioned embodiments are briefly described for clarity, those skilled in the art will understand how to make any changes, if necessary, to the above-described apparatus and methods to accommodate these and other embodiments and applications.

What is claimed is:

1. A system to aid in the prevention of file enumeration attacks, the system comprising:
   a web server associated with a website;
   a data repository; and
   a developer device configured for automatically:
   determining, in response to an indication from a developer, a list of files comprising each file stored in the data repository that is associated with the website;
   determining a list of user roles comprising each user role stored in the data repository that is associated with the website;
   creating a user to be stored in the data repository associated with a first user role in the list of user roles;
   modifying the user stored in the data repository, via a repository application programming interface ("API"), to be associated with a second user role from the list of user roles;
   for each combination of (i) user role in the list of user roles and (ii) file in the list of files, logging into the website as the user role and attempting to open the file via the API, wherein logging into the website as the user role comprises logging into the website via a Hypertext Transfer Protocol ("HTTP") request to the web server as the user associated with the first user role in the list of user roles and logging in as the modified user associated with the second user role in the list of user roles; and
   sending a report indicating a success or a failure of each combination.

2. The system of claim 1, wherein the developer device queries the data repository via the API to determine the list of files comprising each file in the data repository that is associated with the website.

3. The system of claim 1, wherein the developer device queries the data repository via the API to determine the list of user roles comprising each user role in the data repository that is associated with the website.

4. The system of claim 1, wherein the developer device is to further:
   create, via the repository API, a first user in the data repository wherein the first user is not associated with a user role;
   perform an access attempt for each file in the list of files by logging into the website as the user that is not associated with a user role; and
   create the report indicating the success or failure of the attempt to access each file in the list of files based on the first user that is not associated with a user role.

5. The system of claim 1, wherein the success or the failure of the attempt to access each file is indicated by HTTP codes.

6. The system of claim 1, wherein each user role is associated with restricting file access.

7. A method to aid in the prevention of file enumeration attacks, the method comprising:
in response to receiving an instruction from a developer, automatically (i) determining, via a processor, a list of files comprising each file in a data repository that is associated with a developer website;
(ii) determining a list of user roles comprising each user role in the data repository that is associated with the website;
(iii) creating a user to be stored in the data repository associated with a first user role in the list of user roles;
(iv) modifying the user stored in the data repository, via a repository application programming interface ("API"), to be associated with a second user role from the list of user roles;
(v) for each combination of (i) user role in the list of user roles and (ii) file in the list of files logging into the website as the user role and attempting to open the file via the API, wherein logging into the website as the user role comprises logging into the website via a Hypertext Transfer Protocol ("HTTP") request to the web server as the user associated with the first user role in the list of user roles and logging in as the modified user associated with the second user role in the list of user roles; and
(vi) sending a report after performing the access attempt for each combination of user role and file, the report indicating a success or a failure of each combination.

8. The method of claim 7, wherein the list of files comprising each file in the data repository that is associated with the website is determined by:
querying the data repository via the repository API; and
receiving the list of files in response to the querying.

9. The method of claim 7, wherein the list of user roles comprising each user role in the data repository that is associated with the website is determined by:
querying the data repository via the repository API; and
receiving the list of user roles in response to the querying.

10. The method of claim 7, further comprising:
creating, via the repository API, a first user in the data repository wherein the first user is not associated with a user role;
perform an access attempt for each file in the list of files by logging into the website as the user that is not associated with a user role; and
creating the report indicating the success or failure of the attempt to access each file in the list of files based on the first user that is not associated with a user role.

11. The method of claim 7, wherein the attempt to access each file in the list of files based on each user role in the list of user roles is via an HTTP request.

12. The method of claim 7, wherein the attempt to access each file in the list of files is performed directly from within a development environment.

13. A non-transitory computer-readable medium storing program code executable by a computer processor to perform a method to aid in the prevention of file enumeration attacks, wherein execution of the code causes the computer processor to:
in response to receiving an instruction from a developer, automatically (i) determine, via a processor, a list of files comprising each file in the data repository that is associated with a developer website;
(ii) determine a list of user roles comprising each user role stored in the data repository that is associated with the website;
(iii) create a user to be stored in the data repository associated with a first user role in the list of user roles;
(iv) modify the user stored in the data repository, via a repository application programming interface ("API"), to be associated with a second user role from the list of user roles;
(v) for each combination of (i) user role in the list of user roles and (ii) file in the list of files logging into the website as the user role and attempting to open the file via the API, wherein logging into the website as the user role comprises logging into the website via a Hypertext Transfer Protocol ("HTTP") request to the web server as the user associated with the first user role in the list of user roles and logging in as the modified user associated with the second user role in the list of user roles; and
(vi) send a report indicating the success or failure of each combination.

14. The medium of claim 13, wherein the list of files comprising each file in the data repository that is associated with the website is determined by querying the data repository via the repository and receiving the list of files in response to the querying.

15. The medium of claim 13, wherein the list of user roles comprising each user role in the data repository that is associated with the website is determined by querying the data repository via the repository API and receiving the list of user roles in response to the querying.

16. The medium of claim 13, wherein the computing device is to further:
create, via the repository API, a first user in the data repository, the first user not associated with a role, access the website by logging into the web server as the user that is not associated with a role; and
perform an access attempt for each file in the list of files based on the first user that is not associated with a role; and
creating the report indicating the success or failure of the attempt to access each file in the list of files based on the first user that is not associated with a role.

17. The medium of claim 13, wherein the success or failure of the attempt to access each file is indicated by HTTP codes.

18. The medium of claim 13, wherein the attempt to access each file in the list of files is performed directly from within a development environment.

* * * * *